Sept. 21, 1948.　　　　　C. L. PAULUS　　　　　2,449,566
AIRCRAFT FLIGHT STABILIZING
CONTROL UNIT AND SYSTEM
Filed July 10, 1945　　　　　　　　　　　　　3 Sheets-Sheet 3
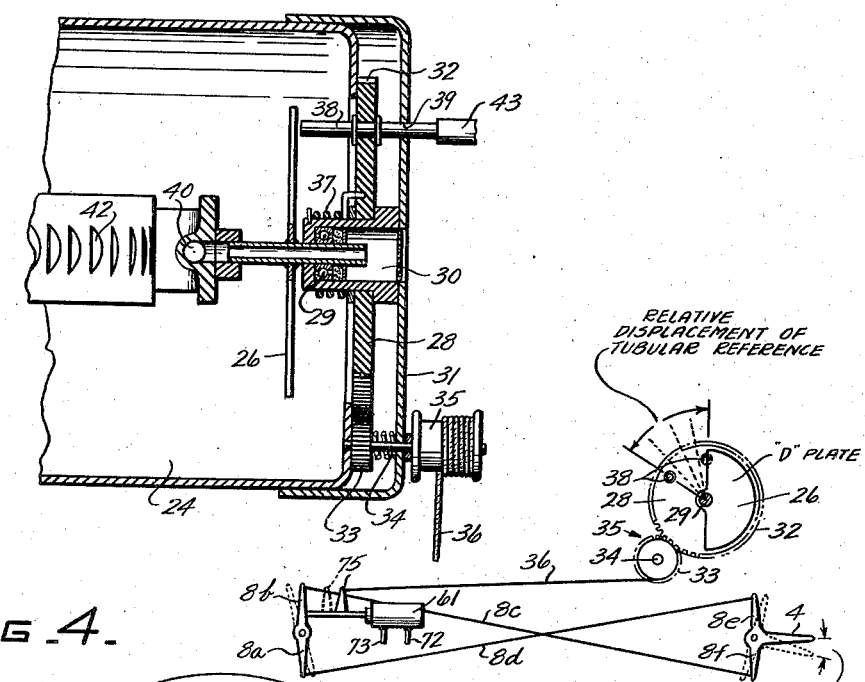
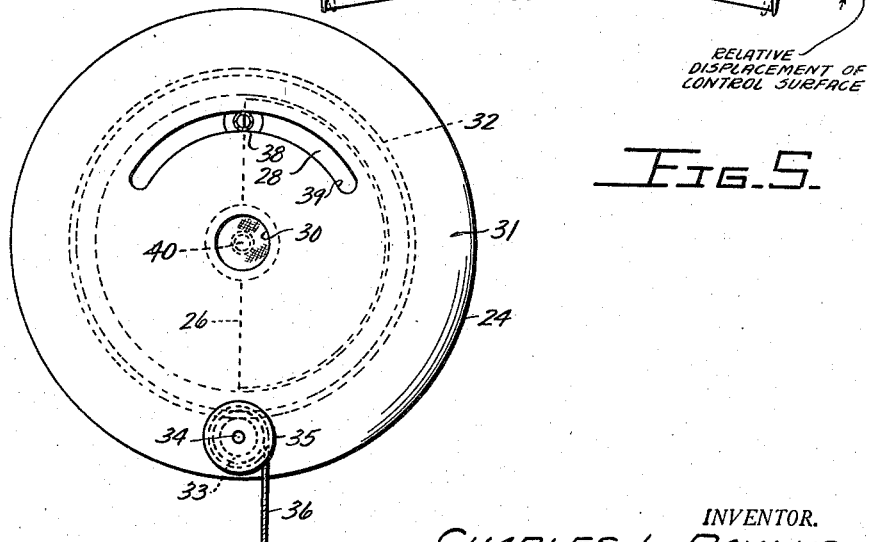
INVENTOR.
CHARLES L. PAULUS
BY
　　Clade Koontz and
　　Charles H. Wagner
　　　　ATTORNEYS.

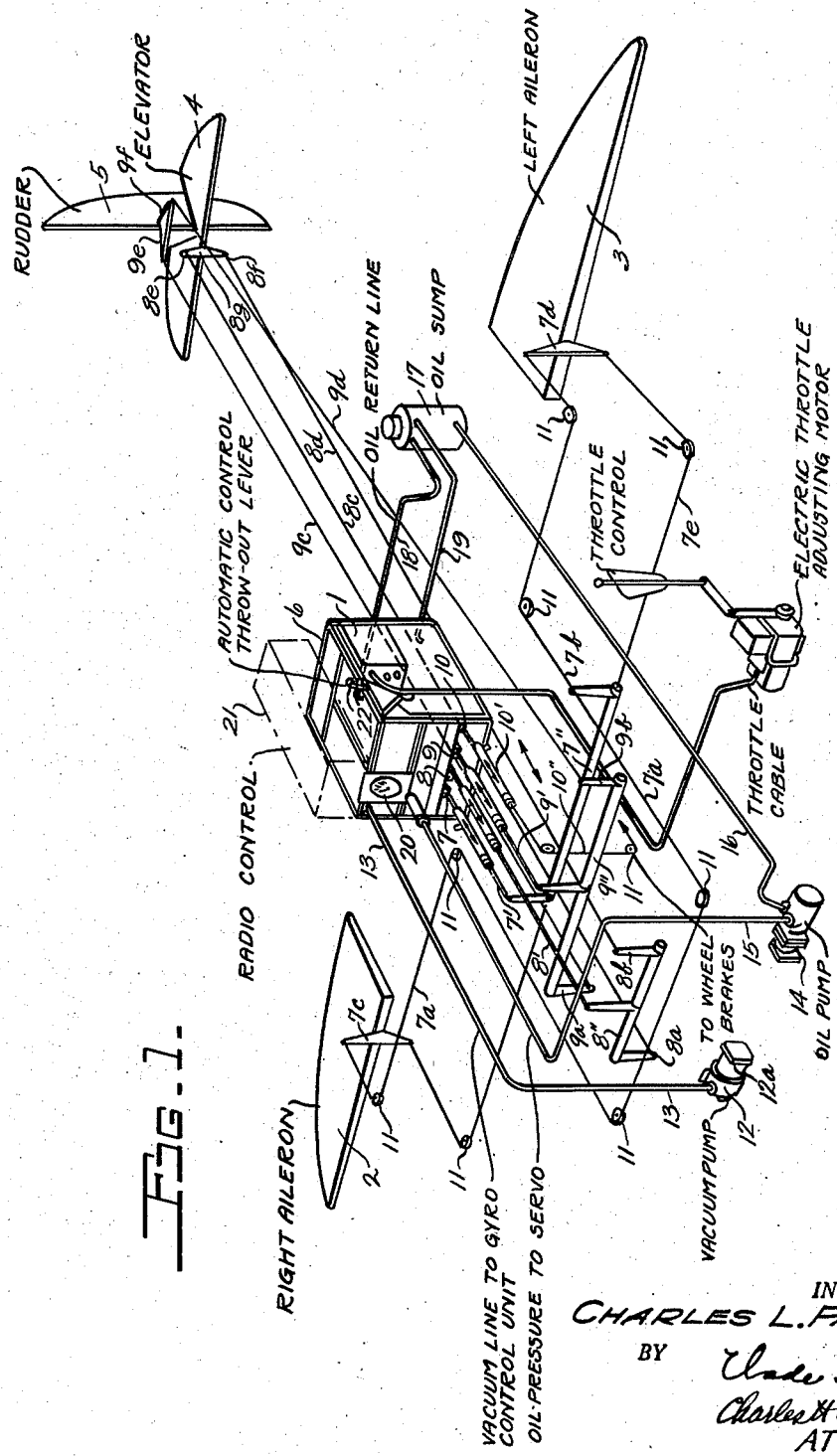

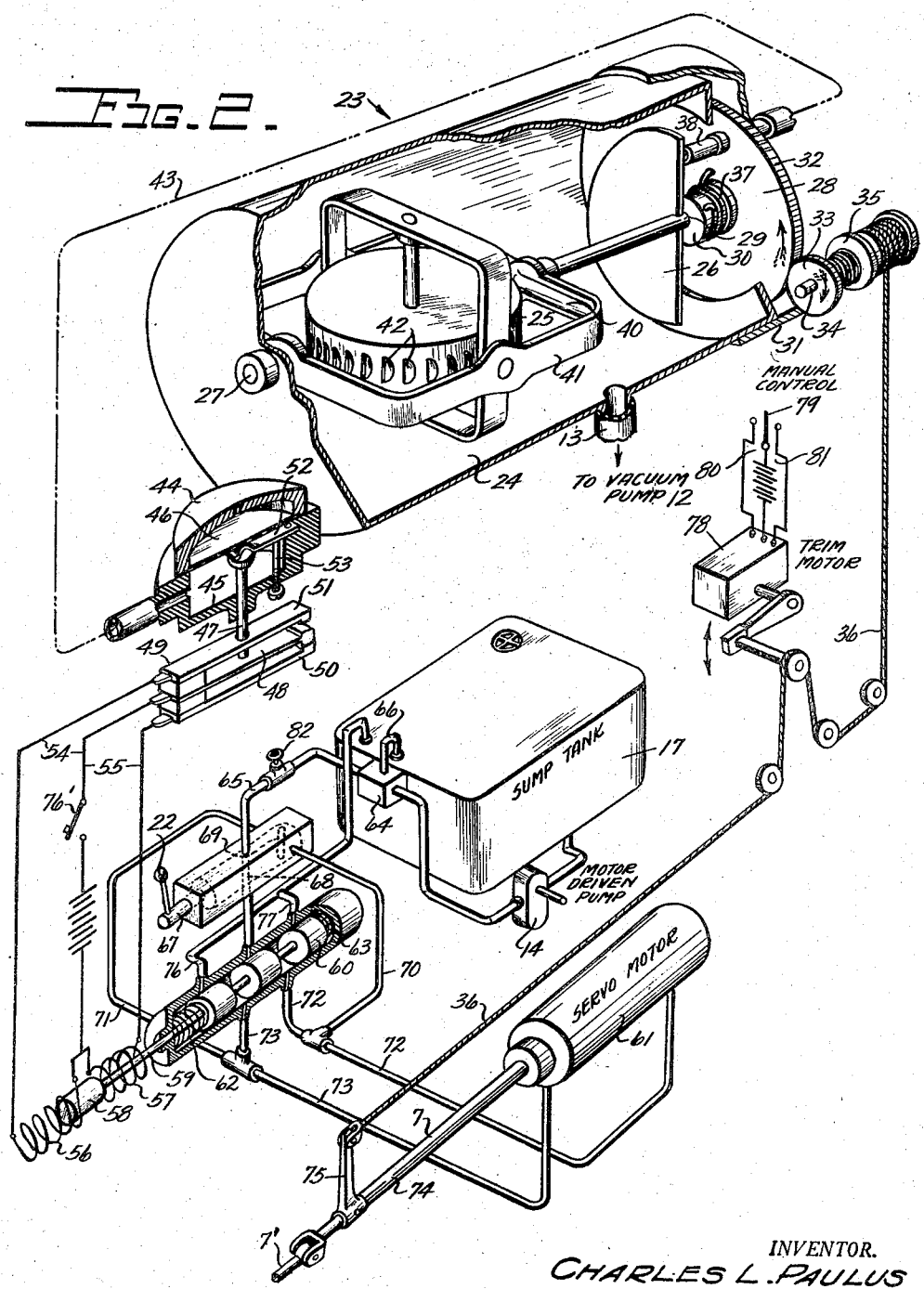

Patented Sept. 21, 1948

2,449,566

UNITED STATES PATENT OFFICE 2,449,566

AIRCRAFT FLIGHT STABILIZING CONTROL UNIT AND SYSTEM

Charles L. Paulus, Dayton, Ohio

Application July 10, 1945, Serial No. 604,282

4 Claims. (Cl. 244—76)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in automatic stabilizing systems for airplanes and other dirigible aircraft, and has for an object the provision of simple and improved control and follow-up systems for automatic steering control devices such as automatic pilots, whereby the control devices are adapted to control or govern the equilibrium or direction of flight of substantially any type of aircraft when the devices are installed therein without special adjustments or "tailoring" of the devices for the particular aircraft in which they are installed, thereby providing unitary and interchangeable flight control devices adapted for universal use in substantially any type of aircraft.

A further object of the invention is the provision of an automatic pilot device which may be manufactured, assembled, and adjusted, ready for installation in substantially any type of dirigible aircraft without further material adjustments or calibrations for the particular aircraft in which it is used.

Another object is the provision of an improved follow-up system for an automatic pilot unit, located between the servo motors thereof for actuating the respective stabilizing flight control surfaces of the aircraft in which the device is installed and the gyroscope controlled reference members of the pilot units, for effecting instantaneous and smooth stabilizing corrections of the equilibrium and direction of the aircraft at all times during the flight thereof, when the aircraft's normal flight direction or equilibrium is disturbed.

In control devices of the automatic pilot type considerable difficulty has been experienced in providing a unitary control device capable of manufacture by the so-called mass production methods and when assembled and calibrated is ready for immediate installation and use in substantially any type of aircraft without the making of special adjustments or calibration of the device or its operating parts for the particular type of aircraft in which it is used.

In conventional follow-up systems for automatic pilots now in use, a ratio of relative follow-up movement of the gyroscope controlled reference members with respect to the degree of movement of the control surface or steering elements of less than one to one is usually employed. In other words, movement of one of the steering control surfaces of the aircraft by the servo-motor resulting from relative displacement between the gyroscope controlled reference member and the servo-actuated reference member when the aircraft tilts, causes an angular displacement between the servo-motor actuated servo reference member and the gyroscope actuated reference member, with respect to a predetermined normal relationship between the two members, never exceeding the degree of movement of the servo-motor actuated flight control surface. This degree of relative follow-up movement of the conventional servo-motor actuated reference control member with respect to the position of the gyroscope actuated reference member is small and relatively slow, which makes the response of an aircraft to a correction signal comparatively slow and somewhat sluggish, there being a tendency for the aircraft to drift beyond its normal equilibrium or level flight position before the two reference members are again in their predetermined cooperating flight stabilizing positions. This comparatively slow and short follow-up movement prevents the plane from being entirely stabilized, with the result that the plane is brought to level or stabilized position so slowly that it is not possible to fully stabilize or level the plane in rough air.

Another condition contributing to the inefficiency of some types of automatic pilot control devices is slack in the control connections between the flight control surfaces of the plane and the servo-motor for actuating the control surfaces under the control of the automatic pilot control devices. On slow flying planes, small movements of the flight control surfaces from their normal flight or mid positions due to a relatively small correction signal have little or no immediate effect in quickly restoring the plane to its desired equilibrium, with the result that an appreciable change in the equilibrium of the plane may occur before the plane will effectively respond to the pilot device. Small changes in the direction or equilibrium will cause the gyroscope to displace its reference members, calling for a correction signal, but the operation of the servo-motor for moving the control surface, having such a low follow-up ratio just about takes out slack in the control connections and possibly move the flight control surface to where it begins to take effect when the follow-up functions to arrest movement of the servo-motor, and the flight control surface is not moved sufficiently to effect a stabilizing control on the plane.

In providing an oscillatory or hunting type of automatic pilot control and follow-up means with a relatively high ratio follow-up movement ratio, in conjunction with a very rapid rate of oscillation, each impulse of the servo-motor as communicated to the control surface is immediately followed by a counterimpulse tending to cancel out or oppose the preceding impulse. These rapid impulses and counterimpulses, effective on the control surface of the airplane, when the plane is flying level are normally equal to each other in intensity, immediately counteracting each other. Since the impulses are each too fast for the airplane to follow, they do not individually produce any change in the equilibrium of the aircraft, unless the impulses in one direction are greater in intensity than the impulses in the opposite direction.

In my improved control system, I utilize an "on and off" or hunting type of control, without the "dead spot," causing the servo-motor to be continuously oscillated, and by employing a much higher follow-up ratio than conventionally employed in automatic pilots now in use, I eliminate the previously referred to slow response to control signals and the cables, and other objections found in conventional automatic pilots now in use maintaining the plane fully stabilized at all times and instantaneously responsive, even when correction signals of small angular magnitude are given. By employing the oscillating type of servo-motor control in combination with a high follow-up control ratio of from 2 to 1, up to 8 to 1, the continuous oscillation, or strokes or oscillation of the servo-motor are very rapid. When the flight control surface is displaced, for instance, one degree by the servo-motor, the follow-up ratio produces a follow-up movement on the servo actuated shiftable reference control, with respect to the gyroscope reference, of from 2 to 1 up to as high as 8 to 1, compared with the angular displacement of the flight control surface, while in conventional pilots, a conventional follow-up ratio of 1 to 2 or lower is now in common use.

The continuous oscillation of the servo motor and the servo actuated reference member and the flight control surface in relation to the gyroscope actuated control reference member is so rapid, that the plane does not respond to each of these individual oscillations in normal or straight flight, the oscillatory movement of the servo-motor being sufficient to take out any play or slack in the controls connecting the flight control surfaces and move the flight control surfaces to the angular positions where further movement of the flight control surfaces in either direction will become immediately effective to produce a stabilizing correction on the plane when such a stabilizing correction signal is received.

When a somewhat violent displacement in the equilibrium of the plane occurs, the position of the reference control element of the gyroscope shifts with respect to the mean point or position of the servo-motor actuated reference member to cause an immediately responsive corrective torque to be applied to the airplane. Since each of the servo-actuated control elements for each of the gyroscope control reference elements of the automatic pilot unit is in continuous oscillation, one or more of the gyroscope references will be displaced with respect to the mean positions of the oscillating servo-motor actuated reference members, calling for an immediate correction depending upon the relative change in position of the plane. The servo-motor is then caused to oscillate a greater distance at one side of the mean oscillatory position, shifting the flight control surface during the oscillations, the follow-up action being equivalent to a condition where a much more violent displacement of the plane's equilibrium had occurred with the result that the aircraft is quickly snapped back to its normal level flight position by a series of very rapid impulses of the servo-motor actuated flight control surfaces. The impulses in the equilibrium restoring direction being initially much greater in magnitude than the impulses in the opposite direction but reducing in intensity as the plane returns to its normal equilibrium or level flight condition. When the normal flight condition is reached, oscillations are equalized, and being so rapid and of comparatively low magnitude, they have no oscillatory effect on the plane during the normal level flight thereof. The return of the plane to equilibrium is therefore rapid, smooth, and continuous.

Like reference characters referred to like parts on the several figures of the drawings, in which Fig. 1 is a somewhat diagrammatical perspective view illustrating the control elements of an airplane with my improved flight control unit incorporating my flight control system in operative association therewith;

Fig. 2 is a perspective view, illustrating somewhat diagrammatically, an arrangement of one of the flight control elements of the control unit, parts being broken away and shown in section;

Fig. 3 is a longitudinal sectional view taken through one end of the gyroscope casing showing the gyroscope and servo-motor reference control elements;

Fig. 4 is an end view of the gyroscope's casing as seen in Fig. 3; and

Fig. 5 is a diagrammatic view showing the relation between the movement of the flight stabilizing reference member and the movement of the flight control surface.

Referring more particularly to Fig. 1 of the drawings, the reference numeral 1 indicates my improved control unit, which may be located at any convenient position within an airplane having the usual flight control surfaces, such as right and left ailerons 2 and 3, elevator 4, and rudder 5. The control unit 1 is a complete unitary structure suitably inclosed in a rectangular frame 6, including a plurality of individual control units 7, 8, 9, and 10 connected by suitable actuating means such as the operating rods 7', 8', 9' and 10' to the control shafts 7'', 8'', 9'', and to the wheel brake operating cable 10''. The control shaft 7'' is in turn connected by actuating cables 7a and 7b to the upper ends of the aileron operating arms 7c and 7d, while the other or lower ends of the respective arms or horns are connected together by an operating cable 7e, suitable pulleys 11 being provided for training the cables around angles in a conventional manner. The operating shaft 8'' has vertically extending arms 8a and 8b connected respectively by cables 8c and 8d to the opposite ends 8e and 8f of the elevator actuating arm 8g fixed to the elevator 4. The rock shaft 9'' is also conventionally provided with oppositely extending arms 9a and 9b connected by cables 9c and 9d to the opposite ends 9e and 9f of the rudder actuating arm, fixed to the steering control surface or rudder 5.

The stabilizing control unit 1 requires a vacuum or suction pressure to operate some of its cooperating elements, later to be described, and a vacuum pump of conventional construction is provided, as indicated at 12, suitably driven by a motor 12a. The suction conduit from the vacuum pump 12 to the unit 1 is indicated at 13.

Oil or fluid pressure is also required by the unit 1 to operate the servo-motors therein, later to be described, and a suitably located, power driven, conventional oil pump 14 is provided, having a pressure fluid delivery conduit 15 connecting the control unit 1, and a pressure fluid supply conduit 16 for supplying the pressure fluid or oil to the pump 14 from a pressure fluid or oil supply source, such as a sump or receptacle 17, which in turn is connected to the control unit 1 by two fluid pressure oil conduits 18 and 19.

The control unit 1 is preferably provided with suitable direction indicating instruments, one of which is indicated at 20, forming no part of the present invention. The unit may also be adapted for radio control, in which event a conventional radio control unit such as indicated at 21 is mounted directly upon the unit if desired, this radio receiver forming no part of the present disclosure, further illustration or reference thereto is not made.

The control unit 1 is primarily designed to be a compact flight control apparatus of the automatic pilot type, requiring no individual adjustments or "tailoring" for any particular installation in any conventional aircraft other than the operating connections between the servo-motors in the unit and the flight control surfaces of the plane in which it is installed, and, of course, the oil and suction pressure line connections for furnishing the operating power for the unit.

Means are provided on the unit, later to be described in detail, for interrupting the automatic flight control by by-passing the pressure fluid from the pump 12 to the sump 17, around the servo-motors. A manually operable automatic control throw-out lever 22 is provided, mounted at one side of the unit 1 in convenient reach, for interrupting the automatic control.

As previously indicated, the control unit 1 comprises a rectangular frame 6 having four individual control units therein, indicated somewhat diagrammatically in Fig. 1, as 7, 8, 9, and 10, these reference characters leading to the control or piston rods respectively of the oil operated servo-motors for the individual units within the frame. Since the servo motors are all identical, as well as the individual control units and follow-up means for the ailerons, elevator, and rudder flight control surfaces of the plane in which the unit is installed, only one of the individual control units will be described.

Referring to Fig. 2, 23 indicates a gyroscope reference member or stabilizing element comprising a casing 24 having a gyroscope 25 gimbaled therein, carrying the usual gyroscope reference member or D plate 26, suitably journaled in the ends of the casing 24 in the usual manner as indicated at 27 and 29. The servo actuated reference member 28 has a sleeve-like journal bearing 30 fixed to the end closure 31 for the casing 24. The servo reference member 28 carries a peripheral gear 32 meshing with an actuating pinion 33 carried on a shaft 34, journaled in the end of the casing 24, and in the cover or closure 31 for the end of the casing. A cable drum 35 is fixed on the shaft 34 and has a servo-motor actuated control cable 36 wound thereon with one end of the cable secured to the drum. A coil spring 37 surrounding the journal bearing member 30, tensions the servo actuated reference member in a counter-clockwise direction against the pull on the servo actuated cable 36, so that when the cable is slacked, this spring will rotate the servo reference member 28 to take up the cable slack, one end of the coil spring 36 being secured to the sleeve journal 30 while the other end of the spring 36 is fastened to the servo reference disc 28.

A tubular servo reference member 38 passing through the reference disc 28 has one end thereof disposed in juxtaposed relation to the plane of movement of the D plate 26, so that the face of the D plate will close the opening of the tubular reference member when the tubular reference 38 and the D are adjacent each other. The other end of the tubular reference member 38 projects from the face of the disc 28, through an arcuate slot 39 provided in the end closure or cover 31 for the casing 24.

In the pneumatically operable type of gyroscope illustrated, air is exhausted from the casing 24 through the conduit 13 connected to the vacuum pump 12 previously referred to. The air for driving the gyroscope wheel or rotor enters from atmosphere through the gimbal supporting shaft on which the D plate 26 is fixed, the air being conducted through conduits 40 formed in the gimbal frame 41, to a jet opening (not shown) which directs a jet of the air against buckets 42 located in the periphery of the gyroscope wheel.

The tubular servo reference member carrying disc 28 closes the end of the casing 24, preventing entrance of air thereinto, except for the air for driving the rotor, entering the central gimbal supporting shaft.

A flexible suction conduit 43 is connected at one end to the tubular reference member 38 and at the other end to a pneumatic switch device 44 having a suction chamber 45 closed by a flexible diaphragm 46 extending over the chamber. A vertical switch actuating plunger or rod 47 is provided for moving a contact blade 48 of a double pole "micro-switch" 49.

When the gyroscope D platt 26 is relatively rotated with relation to the position of the tubular servo reference member 38, suction within the casing 24 is communicated to the chamber 45 of the pneumatic switch device 44, moving the diaphragm 46 downwardly, to shift the intermediate contact blade 48 into circuit closing engagement with the lower contact blade 50. When the D plate 26 is relatively shifted to close the end of the tubular reference member 38, suction to the chamber 45 is cut off allowing the diaphragm 46 to raise and the contact blade 48 is then caused to separate from the lower contact 50 and engage the upper contact blade 51, opening the first-mentioned circuit 55 and closing a second controlling circuit 54. A leaf spring member 52 is disposed between the diaphragm 46 and the plunger 47, provided with an adjusting screw 53 for regulating the amount of suction necessary to deflect the diaphragm 46, bringing the intermediate contact blade 48 and the lower contact 50 into circuit closing relation.

The control circuits 54 and 55 lead from the "micro-switch" device 49 to solenoid coils 56 and 57, controlling the movement of an armature 58 fixed on a shaft 59, operating a hydraulic control valve 60, controlling the direction of movement of a piston within the servo-motor 61. The control valve 60 is provided with balancing springs 62 and 63 located between the ends of the valve casing and the ends of the valve member proper, as seen in Fig. 2 of the drawings. The oil or pressure fluid supply sump 17, previously referred to, supplies the servo-motor operating pressure fluid to the oil pump 14, which in turn forces the pressure fluid to a pressure control relief valve 64, supplying the pressure fluid under a predetermined operating pressure to the control valve 60 through a conduit 65, excess pressure opening the relief valve 64 to return a portion of the pressure fluid to the sump 17 through a conduit 66.

A by-pass valve 67 is provided, located intermediate the pressure relief valve 64 of the control valve 60 so that the operation of the servo-motor under control of the valve 60 can be interrupted. When the by-pass valve 67 is in one position, pressure from the conduit 65 is conveyed directly to the valve chamber for the valve 60 through a conduit 68 in the by-pass valve member 67. When it is desired to interrupt the automatic control, the by-pass valve 67 is rotated by the handle 22 to displace the port 68 in the valve with respect to the supply conduit 65 in the valve casing, and a series of passages in the valve 69, one of which is shown, are brought into communication with the by-pass conduits 70 and 71 connected at their opposite ends to the conduits 72 and 73, which connect the opposite ends of the cylinders of the servo-motors 61 to the main control valve 60.

The servo-motors each comprise a cylinder, having a piston therein, and a piston rod 74 extending therefrom through a packed aperture, referred to generally in Fig. 1 of the drawings, as one of the rods 7, 8, or 9.

The servo-motor piston rods 74 each have a laterally extending arm 75 fixed thereto and the servo-motor actuated "follow-up" control cables 36 are connected to these arms.

When the control valve 60 is moved axially in one direction or the other, depending upon the energizing of one or the other of the solenoids 56 or 57, pressure fluid will be admitted to one or the other ends of the servo motor 61 through one or the other of the conduits 72 or 73, and fluid in the other end of the servo motor will be returned to the sump 17 through one of the return conduits 76 or 77.

A trim motor 78 is provided for tensioning or slackening the cable 36 to cause displacement of the servo reference member 38 with respect to the D plate 26 upon manual manipulation of the switch member 78, closing one or the other of the control circuits 80 or 81, operating the trim motor 78 in one direction or the other. This trim motor construction is not a part of the present invention and will not be described further, other than to indicate that it provides means for manual adjustments of the flight control surface 2, 3, 4, and 5 of the plane to steer and control the equilibrium of the plane independently of the gyroscope control devices. The pressure fluid supply conduit 65 leading from the pump 14 to the control valve 60 is provided with a flow regulator valve 82 to regulate the rate of flow of the pressure fluid to the servo motor, and as a result, the speed of operation of the servo motor is regulated.

During the operation of the apparatus, the "micro-switch" 49 is in a state of continuous actuation so that one or the other of the control circuits 54 and 55 is always closed, unless the main switch 76′ is opened. As the control valve 60 is shifted toward one end of its valve chamber, fluid is admitted to one end of the servo motor cylinder 61 causing the piston 74 to move toward the opposite end of the cylinder, either tensioning the cable 36 or slackening the cable, depending upon the direction of movement of the servo-motor piston. This movement of the cable either actuates the winding drum 35, rotating the tubular reference carrying disc 28 in one direction, displacing the tubular reference member 38 away from the D plate 26, or permitting reverse rotation of the winding drum and winding of the cable thereon incident to rotation of the reference carrying disc 28 in the opposite direction by the coil spring 37, to displace the tubular reference member 38 past the edge of the D plate, closing the opening through the tubular reference member.

Referring again to Fig. 2, when the tubular reference carrying disc 28 is moved clockwise, suction or low pressure within the gyroscope casing 24 withdraws air through the conduit 43 from the chamber 45 in the pneumatic valve unit, depressing the diaphragm 46, which in turn moves the actuating plunger downwardly against the adjusted tension of the leaf spring 52 to shift the central contact spring 48 of the double pole "micro-switch" into contact with the lower contact blade 50. Closing of the circuit 55 to the solenoid coil 57 causes the armature, attracted by the coil, to move the control valve 60 to the right, permitting pressure from the fluid pressure conduit 65 to pass through the valve 60 and the conduit 73 to the left-hand end of the servo motor 61, moving the piston 74 inwardly, or to the right, causing a slackening off movement on the cable 36. The coil spring 37 on the pivot journal of the servo reference carrying disc 28 rotates the disc 28 counterclockwise and the cable drum in a clockwise direction, winding the slack in the cable 36 onto the winding drum 35 and moving the tubular reference 38 towards the edge of the D plate 26 until the opening through the tubular reference member is covered by the D plate. Suction is now interrupted between the interior of the gyroscope casing 24 and the pneumatic valve chamber 45 by the D plate and the leaf spring 52 raises the diaphragm, permitting the plunger and the center contact blade 48 of the "micro-switch" to move into contact with the upper contact blade 51, opening the circuit 55 and closing the circuit 54, energizing the solenoid coil 56. This reverses the position of the control valve 60, so that the pressure fluid from the conduit 65 will be conducted through the conduit 72 to the opposite end of the servo-motor 61, moving the piston outwardly, or to the left, causing the cable 36 to be pulled as the servo piston moves outwardly, rotating the winding drum 35 which in turn rotates the tubular reference carrying disc 28 clockwise to again move the tubular reference into communication with the suction pressure within the gyroscope casing 24, and the suction pressure is again effective on the diaphragm 46 in the pneumatic valve 44 to depress the same.

When a plane having the device installed therein is in level flight, the tubular reference members 38 will be oscillated back and forth continuously with respect to the edges of the gyroscope reference members or D plates and the flight control surfaces of the plane, being connected to the servo-motor pistons will also be in a state of continuous oscillation. By adjusting the flow regulation valves 82, the rate of oscillation of the servo motors are controlled so as to be very rapid. The ratio of movement of the tubular reference 38 with respect to the D plate 26, compared with the angular movement of the flight control surface of the plane, has a ratio of from one degree of movement of the airplane flight control surface to from two to eight degrees of movement of the tubular reference 38 and the rate of oscillation of the servo-motor being 300 to 500 cycles per minute, is too rapid for the aircraft to follow.

When the equilibrium of the aircraft is disturbed, the apparatus, including the gyroscope casing 24 tilts while the gyroscope D plate or gyroscope reference member remaining fixed in space, displacing the mid point between the limits of oscillation of the tubular reference 38 with respect to the edge or cut off position of the D plate so that the period when the tubular reference is in communication with the gyroscope casing will be changed with respect to the period when the tubular reference is covered by the D plate. This displacement of the reference members causes a corresponding displacement with respect to the center point of reciprocation of the servo-motor piston 74, and as a result, the flight control surfaces of the plane, such as one of the elements 2 to 5, is given a series of rapid oscillations or impulses to restore the plane of its former equilibrium. Since the follow-up ratio is much higher than former conventional follow-up ratios, the return movement of the tubular servo reference, with respect to the D plate, is very rapid, when a correction is called for, either by manipulation of the trim motor 78 due to the manual closing of one or the other of its control circuits 80 or 81 by the manual switch 79, or due to the tilting of the airplane.

By utilizing this high follow-up ratio of from two to one, up to eight to one, as compared to the normal follow-up ratio of less than one to one, and an oscillating or hunting control having a comparative fast rate of oscillation, the control apparatus can be manufactured and adjusted at the factory ready for use in any conventional type of aircraft without special adjustments or "tailoring" with respect to the particular aircraft in which the device is to be used. As a result, the flight control apparatus may be built into a compact unit ready for installation in the aircraft.

When the aircraft direction or level changes, or it is desired to change the flight direction or equilibrium of the aircraft, the two cooperating reference members are shifted with respect to each other either manually or due to movement of the gyroscope reference when the plane equilibrium changes so that the mean point in the oscillation of the servo motor actuated reference is changed with respect to the position of the other cooperating reference. As a result, the corrective impulses, while individually too rapid for the aircraft to follow, are each greater in length or duration than the intermediate counterimpulses, and the total force of the corrective impulses effective on the equilibrium of the plane being greater than that of the intermediate impulses causes the control surface to quickly level the aircraft to the desired position. Since each corrective impulse is followed by an opposing impulse, when the aircraft reaches the level or equilibrium position the impulses in both directions again become equalized and counteract each other and the aircraft cannot tilt beyond the desired flight position. As a result, when the aircraft is tilted, the aircraft immediately comes back to the desired equilibrium, regardless of the roughness of the air in flight, and the aircraft never goes beyond the desired flight level position on its return, or oscillates back and forth with respect to the desired stabilized flight position.

Having described my improved control system in connection with a pneumatically operable type of pilot device and a hydraulic type of servomotor, it is obvious that the system may be employed in connection with other types of automatic flight control devices, such as electrically operated gyroscopes and servo-motors, without departing from the spirit of the invention as defined in the following claims.

I claim:

1. In a flight attitude determining unit for aircraft, a movable flight attitude controlling reference member, gyroscope means for determining the reference position of said movable flight attitude controlling reference member, a second flight attitude controlling reference member movable to and from a predetermined cooperating reference relation relative to the first-mentioned flight attitude controlling reference member, servo motor means having an actuated part adapted to be connected to a flight attitude controlling surface of an aircraft for actuation of the flight attitude control surface, a follow-up operating connection between said actuated part of the servo motor means and the second flight attitude controlling reference member constructed and arranged to move the second flight attitude controlling reference member in excess of the movement of the actuating part of the servo motor means, means normally operating the servo motor means in one direction when the first and second flight attitude controlling reference members are in said predetermined cooperating relation to each other to move the second flight attitude controlling reference member in one direction out of cooperative relation with respect to the first flight attitude controlling reference member, means operable while the first and second flight attitude controlling reference members are out of cooperative relation to each other to reversely actuate the servo motor means to actuate the follow-up connection to reversely move the second flight attitude controlling reference member back into cooperative controlling relation with the first flight attitude controlling reference member, whereby the second flight attitude controlling reference member and servo motor means are continuously oscillated back and forth relative to mean reference positions, relative to the position of the first flight attitude controlling reference member and the degree of oscillation of the second reference exceeds the degree of oscillation of the servo motor means.

2. In a gyroscope control unit, a supporting frame, servo motor means therein adapted to be connected to a movable flight control surface of an aircraft for flight control actuation thereof, an electrical control circuit in said frame connected to the servo motor means for actuation thereof in one direction to move the flight control surface in one direction, a second electrical control circuit in said frame connected to the servo motor means for actuation thereof in a reverse direction to move the flight control surface in a reverse direction, switch means in said frame movable in reverse directions for selectively closing said first or second electrical control circuits, means normally actuating said switch means to close one of said control circuits, a gimballed gyroscope rotor in the frame having a spin axis, a gyroscope controlled reference member in said frame connected to the rotor gimbal means having a predetermined reference position relative to the spin axis of the rotor, a second cooperating reference control member movable in the frame to and from a predetermined cooperating controlling reference position relative to the gyroscope controlled reference member, switch actuating means operative between the gyroscope controlled reference member and a second reference control member operable when the gyroscope controlled reference member and the second reference control member are moved to said predetermined reference position relative to each other to actuate the switch means to open the first electrical control circuit and close the second electrical control circuit to reversely actuate the servo motor means, said switch actuating means including a flexible follow-up connection between the servo motor means and a second reference control member for moving the second control reference member in excess of the movement of the servo motor means, whereby an excessive oscillation of the second reference member relative to the gyro controlled reference member produces a smaller oscillation of the servo motor means relative to a mean reference position of the servo motor means.

3. In a flight attitude control unit for universal use in aircraft, a support, a servo motor in the support adapted to be connected to a flight control surface of an aircraft for actuation of the flight control surface, a gyroscope stabilized flight attitude control reference member, a movable servo motor controlled flight attitude controlling reference member having a predetermined reference position relative to the gyroscope stabilized flight attitude control reference member, a flexible follow-up connection between the servo motor means and the servo motor flight attitude controlling reference member for moving the latter in one direction relative to the gyroscope stabilized flight attitude controlling reference member incident to movement of the servo motor in one direction, separate actuating means for moving the servo motor flight attitude controlling reference member in the opposite direction when the servo motor moves in the opposite direction, means constructed and arranged to operate the servo motor in one direction when the servo motor reference member is in predetermined cooperating reference position relative to the gyroscope stabilized reference member to move the servo motor actuated reference member in one direction to displace the same from said predetermined reference position, and separate actuating means operable when the servo motor reference means is relatively displaced in the last-mentioned direction from said predetermined reference position for reversely operating said servo motor means to move the servo motor actuated reference member in the opposite direction toward said predetermined reference position relative to the gyroscope stabilized reference means, said follow-up means being constructed and arranged to move the servo motor control reference member at a greater speed than the rate of movement of the servo motor means whereby the extent of oscillation of the servo motor means is less than the extent of oscillation of the servo motor actuated reference means, to effect a very rapid and short continuous oscillation of the servo motor means relative to a mean flight control position when the servo motor means is connected to a flight control surface of an aircraft, compared to a similar rapid and longer oscillation of the servo motor actuated reference member relative to said cooperating reference position with the adjusted position of the gyroscope stabilized reference member.

4. In a flight attitude control unit for aircraft, a supporting frame, a plurality of flight attitude control devices secured thereon for controlling pitch, roll, and azimuth corrections of an aircraft in flight, each flight control device comprising a servo motor adapted to be connected to one of the flight control surfaces of the aircraft for actuation of the flight control surface to control one of the pitch, roll, and azimuth deviations of the aircraft in flight, servo motor control means for each servo motor including a gyroscope stabilized servo motor control reference member, a second relatively shiftable cooperating servo motor control reference member having a predetermined reference control position relative to the position of the first mentioned reference control member, a follow-up operating connection between the servo motor means and the second reference member for moving the second reference member relative to the first reference member at a rate in excess of the rate of movement of the servo motor means when the servo motor means is actuated, reversible servo motor actuating control means for actuating said servo motor means to move the second reference control member in one direction toward the predetermined reference position between the two reference control members when the reference control members are displaced from the predetermined reference position, and means automatically operable when the two reference control members are in said predetermined reference position to reversely operate the servo motor means to move the second reference control member in the opposite direction away from said predetermined reference position relative to the gyroscope stabilized reference member, whereby the second reference member is caused to continuously "hunt" back and forth relative to the predetermined reference position, and the servo motor means is correspondingly caused to oscillate with a relatively smaller movement ratio than the oscillating movement of the second reference member, and means in each of said flexible follow-up connections for varying the length of the follow-up connections to change the predetermined reference positions of the second reference control members relative to the mean position of the servo motor means.

CHARLES L. PAULUS.

REFERENCES CITED

The following references are of record in the file of this patent:

UNITED STATES PATENTS

| Number | Name | Date |
| --- | --- | --- |
| 1,625,252 | Hammond, Jr. | Apr. 19, 1927 |
| 1,896,805 | Sperry, Jr., et al. | Feb. 7, 1933 |
| 2,336,096 | Heintz | Dec. 7, 1943 |

FOREIGN PATENTS

| Number | Country | Date |
| --- | --- | --- |
| 546,081 | Great Britain | June 26, 1942 |
| 332,939 | Germany | Dec. 15, 1918 |